(12) United States Patent
Kfir et al.

(10) Patent No.: US 12,483,535 B2
(45) Date of Patent: Nov. 25, 2025

(54) SECURITY POLICY REFACTORING USING AI

(71) Applicant: Check Point Software Technologies Ltd., Tel Aviv (IL)

(72) Inventors: Barak Kfir, Givat-Shmuel (IL); Nofar Bardugo, Ramat-Gan (IL); Dan Karpati, Even-Yehuda (IL); Eliyahu Hanokh Sandler, Bene-Atarot (IL); Tamir Zegman, Tel-Aviv (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 20 days.

(21) Appl. No.: 18/755,973

(22) Filed: Jun. 27, 2024

(65) Prior Publication Data
US 2025/0112963 A1    Apr. 3, 2025

Related U.S. Application Data

(63) Continuation-in-part of application No. 18/476,480, filed on Sep. 28, 2023.

(51) Int. Cl.
| | |
|---|---|
| *H04L 9/40* | (2022.01) |
| *G06F 40/205* | (2020.01) |
| *G06F 40/30* | (2020.01) |
| *H04L 41/0894* | (2022.01) |
| *H04L 41/16* | (2022.01) |

(52) U.S. Cl.
CPC ........ *H04L 63/0263* (2013.01); *G06F 40/205* (2020.01); *G06F 40/30* (2020.01); *H04L 41/0894* (2022.05); *H04L 41/16* (2013.01); *H04L 63/20* (2013.01)

(58) Field of Classification Search
CPC . H04L 63/0263; H04L 63/0272; H04L 63/20; H04L 63/0236; H04L 63/145; H04L 41/0894; H04L 63/101; H04L 63/10; H04L 43/50; G06F 21/6218; G06F 40/205; G06F 7/08; G06Q 40/12
See application file for complete search history.

(56) References Cited

U.S. PATENT DOCUMENTS

| | | | | |
|---|---|---|---|---|
| 2017/0317978 | A1* | 11/2017 | Diaz-Cuellar | H04L 63/0263 |
| 2019/0287183 | A1* | 9/2019 | Bishnoi | G06F 40/205 |
| 2020/0099721 | A1* | 3/2020 | Golan | H04L 63/20 |
| 2025/0106256 | A1* | 3/2025 | Goel | H04L 41/0894 |

* cited by examiner

*Primary Examiner* — Kyung H Shin
(74) *Attorney, Agent, or Firm* — Renner, Otto, Boisselle & Sklar, LLP

(57) ABSTRACT

A computer device (referred to as a processing engine), system, and method are provided for refactoring an original security policy using an artificial intelligence (AI) engine including a large language model (LLM). The processing engine parses policy data converts the original security policy into a code representation and sends the converted code representation to the AI engine. The AI engine analyzes the original security policy by applying the LLM to the code representation and identifies policy insights that are sent to the processing engine.

20 Claims, 3 Drawing Sheets

SECURITY POLICY REFACTORING USING AI

TECHNICAL FIELD

The present disclosure relates generally to software services and, more specifically, to refactoring security policies.

BACKGROUND

Cybersecurity solutions frequently provide security services through the implementation and enforcement of one or more security policies. These security policies often consist of one or more rule sets, which can be either ordered or unordered. Typically, these rule sets include a combination of selectors (conditions) and one or more actions.

Over time, the complexity of rule sets for security policies tend to increase due to continuous incremental modifications. For example, responsive to correlation of previous related security events an automated agent can modify the security policy to add or modify a rule to block a user associated with the related security events. Such modifications over time of the security policies and their rule sets cause the complexity of the rule sets to increase.

A complicated rule set is usually not desirable as it is harder to manage. Complicated rule sets also require more computational resources when managing and matching them. More specifically, they require more storage (including disk and/or RAM) and more CPU cycles when matched. A large rule set is also harder for an administrator to understand. Such complexity would consume more of the administrator's time and could lead to administrator errors. As such, it is often desirable to be able to refactor such security policies in general and their rule sets in particular.

SUMMARY

A system and method are needed for refactoring security policies and their rule sets to manage complexity.

The present disclosure provides a computer device, system, and method for refactoring an original security policy by converting the original security policy into a code representation and sending the converted code representation to an artificial intelligence (AI) engine for processing with a large language model (LLM) to identify policy insights.

By utilizing advanced AI techniques, including large language models trained on code, the LLM can significantly enhance the process of managing and optimizing security policies. It not only improves the efficiency and performance of these policies but it may also reduce the administrative burden and the likelihood of errors, thereby contributing to a more robust and secure cybersecurity framework.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
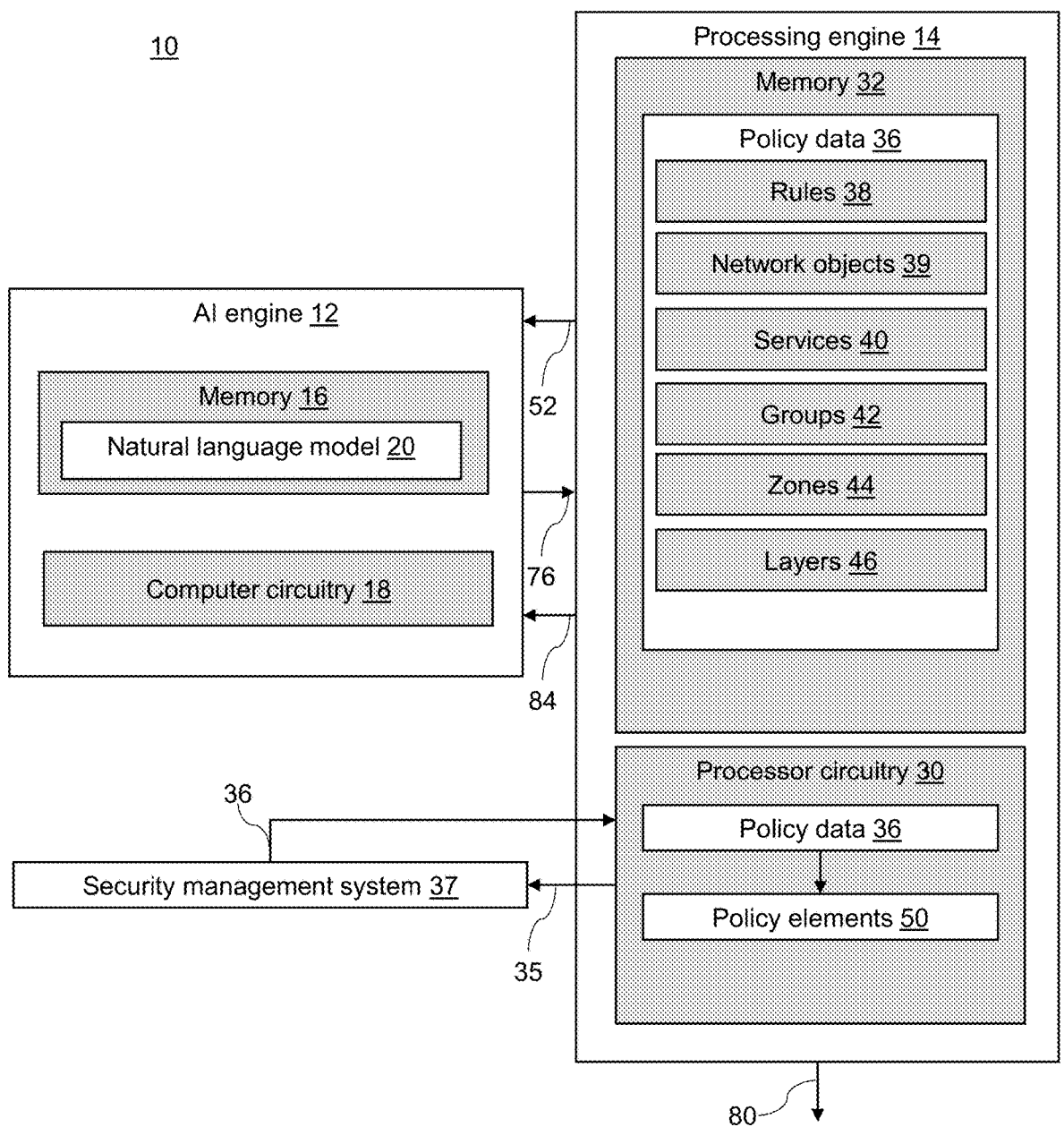
FIG. 1 is an exemplary diagram of a system for refactoring an original security policy.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a computer device (referred to as a processing engine), system, and method for refactoring an original security policy using an artificial intelligence (AI) engine including a large language model (LLM). The processing engine parses policy data, converts the original security policy into a code representation, and sends the converted code representation to the AI engine. The AI engine analyzes the original security policy by applying the LLM to the code representation and identifies policy insights that are sent to the processing engine.

LLMs are trained on large amounts of code and are, for this reason, more capable at analyzing code. Conversely, LLMs are not typically trained on security policies and, for this reason, often have difficulties (i.e., providing inaccurate answers) when processing security policies. For this reason, by converting the security policy into a code representation, the processing engine 14 makes it possible to more fully utilize the capabilities of the LLM (e.g., the code representation of the security policy being more structured and understandable to an LLM). Furthermore, converting the security policy into a code representation may have the additional benefit of more compactly representing the security policy (reducing a size of the security policy by up to 75%). This reduced size has the additional exemplary benefit of easing handling of the security policy by LLMs having a limited context window.

Turning to FIG. 1, a system 10 is shown for refactoring an original security policy. The system 10 utilizes the combined capabilities of an artificial intelligence (AI) engine 12 and a processing engine 14.

The AI engine 12 is a computer device that includes a memory 16 and computer circuitry 18. The memory 16 (also referred to as a non-transitory computer readable medium) stores a large language model (LLM) 20. The LLM 20 allows the system 10 to receive and process natural language commands and prompts.

The LLM 20 may be based on any suitable language model adept at processing and interpreting natural language requests. For example, the LLM 20 may be trained on extensive datasets that include a diverse range of computer code, enabling it to recognize, understand, and analyze various programming languages and code structures. By incorporating datasets containing source code, the LLM 20 can effectively parse and interpret the syntax and semantics of code representations derived from security policies.

Training the LLM 20 on such datasets allows it to leverage its understanding of code to provide detailed analysis and optimization recommendations for the code representation of security policies. As is described in further detail below, this includes identifying inefficiencies, security gaps, and opportunities for optimization within the rule sets of these policies. The LLM 20 may suggest restructuring rules for better performance, removing redundant or conflicting rules, and enhancing the overall security posture by recommending best practices for rule configuration.

Additionally, the LLM 20 can provide insights into the core structure and purpose of the policies, helping administrators comprehend the essence of their security configurations. This understanding aids in the identification of the main security objectives and how they are achieved through specific rules.

Figure 2:
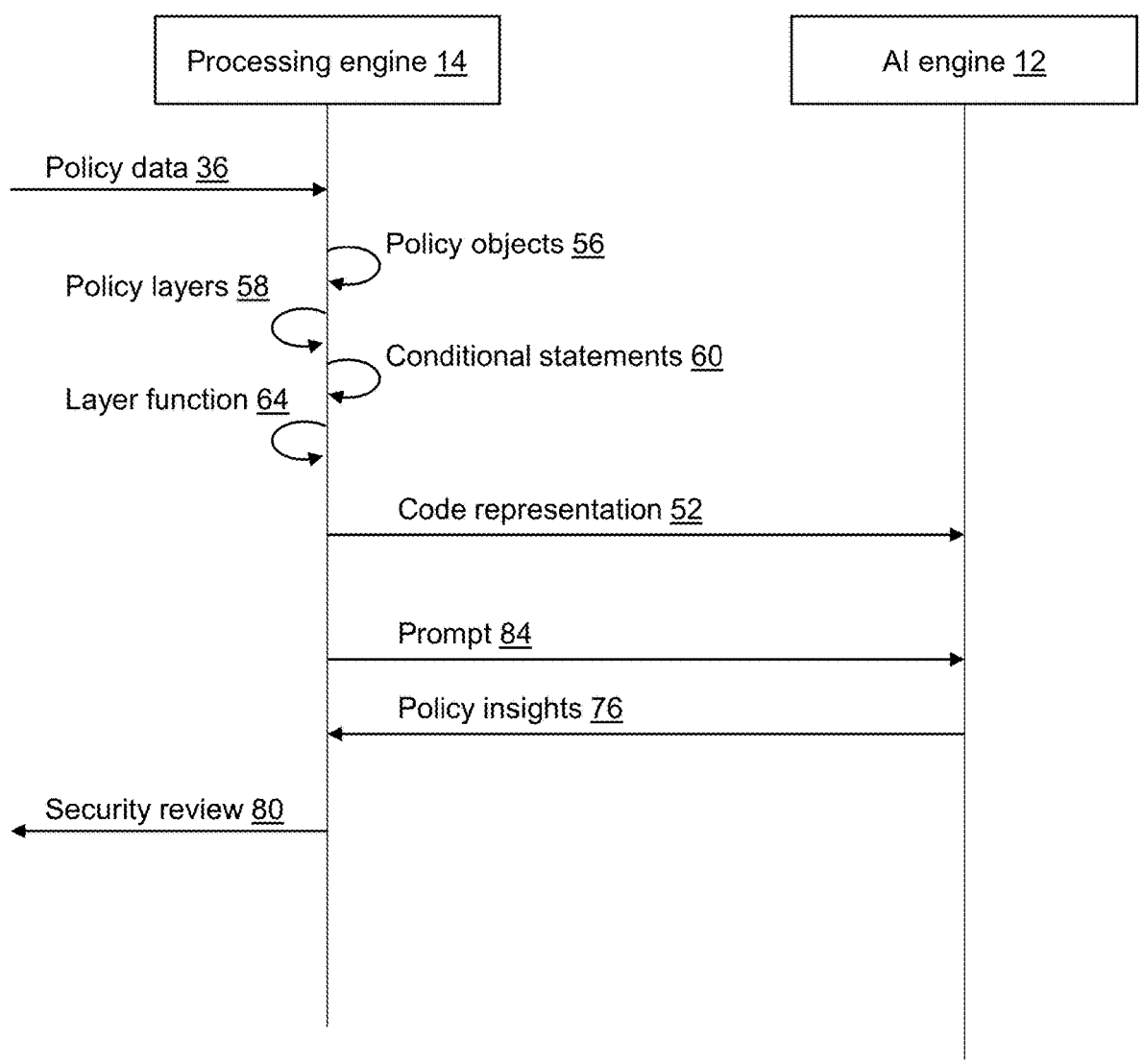
FIG. 2 is a ladder diagram showing movement of information between an artificial intelligence (AI) engine and a processing engine of the system.

With exemplary reference to FIG. 2, the processing engine 14 of the system 10 is an electronic device (e.g., a computer) including processor circuitry 30 and non-transitory computer readable medium referred to as a memory 32.

The processor circuitry 30 receives policy data 36 for the original security policy. For example, the processor circuitry 30 may send a request for the policy data from a security management system using an application programming interface (API). Specifically, the processor circuitry 30 can utilize an API to send a request 35 to a security management system 37, which may manage and maintain security policies and their associated rule sets. This API request 35 can be designed to extract comprehensive policy configurations. The security management system 37 may respond to the request 35 by sending the policy data 36 to the processing engine 14. The policy could also be sent to the processing engine 14 by the Security Management system 37.

The security policy may be deployed and enforced by the security management system 37, which may employ one or more security enforcement modules. The security enforcement modules may include: a network security gateway or firewall; a security agent installed on an endpoint computer; as part of a web browser such as using a web browser extension or plugin or as code (e.g., JavaScript code) embedded in a web page; a proxy server including a web proxy server; a security agent installed on a server computer; a network scanner; etc.

The policy data 36 received by the processor circuitry 30 comprises a configuration of the original security policy and includes rules 38 (also referred to as rule set(s)) and at least one of network objects 39, services 40, groups 42, zones 44 or layers 46. As is explained in further detail below, the rules 38 are typically conditions and actions that dictate how traffic and activities are managed and secured within the network. Each of the rules 38 is associated with one of the layers 46, such that each of the layers 46 is associated with one or more rules 38. That is, the rules 38 are associated with specific layers 46.

The layers 46 may be hierarchical and each layer may include its own set of conditions and rules that must be met for the rules 38 within the layer 46 to be applied. The layers 46 may be hierarchically structured to aid in managing complexity by logically segmenting the policy into more manageable sections (e.g., where all members of the sections have a similar administrative goal).

The network objects 39 may include entities such as IP addresses, subnets, domain names and hostnames that are used to specify sources and destinations in the rules. The services 40 may refer to the types of network services (e.g., HTTP, FTP, or custom-defined services) that are subject to the security policy rules. The groups 42 may be collections of network objects or services that are treated as a single entity for the purposes of the policy, simplifying the management of complex configurations. The zones 44 may represent different segments or areas of the network (e.g., internal, external, DMZ, etc.) to help in logically organizing and applying security measures.

The processor circuitry 30 parses the received policy data 36 to identify policy elements 50. The policy elements 50 comprise the network objects 38, services 40, groups 42, and zones 44 included in the policy data 36. For example, the processor circuitry 30 may parse the policy data 36 by determining element dependencies between the identified policy elements 50 including (1) referred objects and (2) a hierarchical structure of the layers. The referred objects may identify objects referenced by each of the rules.

The rules 38 may be matched against various security related events such as:

The opening of a network connection (source address, destination address, port, etc.);

The receipt of an email (subject, sender's email address/IP address, etc.);

The launch of an application or process on an endpoint computer (the process, process permission, user, etc.);

A user logging in to a server;

A client application making a web service API call;

A change in the configuration of a system being secured;

The loading of a web page in a web browser; and/or

The initiation or completion of a system call.

The trigger (i.e., the condition) for initiating a match could, e.g., be any of the following:

The occurrence of the relevant event;

On a pre-defined schedule (e.g., every hour, once a day, once a week, etc.);

User initiated (e.g., initiated by a security administrator); and/or

The occurrence of other events (e.g., the detection of a security breach, triggered through correlation of other events, etc.).

The processor circuitry 30 converts the original security policy into a code representation 52. To do so, the processor circuitry 30 defines policy objects 56, creates policy layers 58, and translates the rules 38 included in the policy data 36 into conditional statements 60. For example, the code representation 52 may be written in any suitable programming language (such as Python, C, Java, JavaScript, TypeScript, Go, Rust, etc.).

The processor circuitry 30 defines policy objects 56 by translating each of the identified policy elements 50 into a structured code format. For example, the structured code format may be a dictionary or class.

The processor circuitry 30 creates policy layers 58 by defining a layer function 64 for each of the layers 46 in the policy data 36. Each of the layer functions 64 encapsulates the one or more rules 38 associated with the layer 46 defined by the layer function 64.

The processor circuitry 30 translates the rules 38 for each of the layer functions 64 by converting into a conditional statement 60 each of the one or more rules 38 associated with the layer 46 defined by the layer function 64. Each of the conditional statements 60 includes a condition and a corresponding action. The condition includes at least one of a check for source, destination, or service. The corresponding action is performed when the condition is met. For example, below is an exemplary layer function:

```
def Layer_Standard_CLone_ELis_Network(conn):
    # Rule 1: Deny access to env
    if conn.src in objects[54] and conn.dst in objects[55]:
        return "Drop"
    # Rule 2: Allow DNS access
    if conn.src in objects[80] and conn.dst in objects[62] and
    conn.service in
    [objects[60], objects[61]]:
        return "Accept"
    # Rule 3: Allow access to the internet
    if conn.src in objects[14] and conn.dst in objects[33] and
    conn.service in
    [objects [59]]:
        return "Accept"
```

In the above layer function example, three rules are represented as conditional statements with the if statement representing the condition and the "return Accept" or "return Drop" being the action.

The conditions for a conditional statement may include the occurrence of multiple events in a specific order or within a specific duration of time. For example, the condition for a conditional statement may be that a first event occurs within a specific duration of time to a second event or that the second event occurs after the first event.

Provided below is an exemplary code representation 52 for a simple firewall policy:

```
# Define network objects
objects = { }
objects[54] = {"type": "SecurityZone", "name": "InternalZone",
"address":
   "10.0.0.0/24"}
objects[55] = {"type": "SecurityZone", "name": "ExternalZone",
"address":
   "0.0.0.0/0"}
objects[60] = {"type": "Service", "name": "HTTP", "port": 80}
objects[61] = {"type": "Service", "name": "HTTPS", "port": 443}
objects[62] = {"type": "Service", "name": "DNS", "port": 53}
objects[80] = {"type": "Host", "name": "DNS_Server", "address":
"10.0.0.1"}
# Define policy layer
def Layer_Standard_CLone_ELis_Network(conn):
    # Rule 1: Deny access to env
    if conn.src in objects[54] and conn.dst in objects[55]:
        return "Drop"
    # Rule 2: Allow DNS access
    if conn.src in objects[80] and conn.dst in objects[62] and
    conn.service in
    [objects[60], objects[61]]:
        return "Accept"
    # Rule 3: Allow access to internet
    if conn.src in objects[14] and conn.dst in objects[33] and
    conn.service in
    [objects[59]]:
        return "Accept"
# Example connection
connection = {
    "src": objects[54],
    "dst": objects[55],
    "service": objects[60]
}
# Apply policy
action = Layer_Standard_CLone_ELis_Network(connection)
print(action) # Output: Drop
```

The processor circuitry 14 sends the converted code representation 52 to the AI engine 12. The computer circuitry 18 of the AI engine 12 receives the converted code representation 52. The computer circuitry 18 analyzes the original security policy by applying the stored LLM 20 to the received code representation 52 to identify policy insights 76. That is, by the processing engine 14 projecting security policies into code, the AI engine 12 may utilize the LLM 20 to apply its knowledge of programming paradigms to analyze and refactor the security policy represented by the code representation 52. The computer circuitry 18 then sends the identified policy insights 76 to the processing engine 14.

The policy insight may include at least one of an inefficiency, a security gap, an optimization opportunity, or a policy beautification. An inefficiency may comprise at least one of redundant rules, similar conditions combinable into a combined condition, or a restructuring of rules for better performance. That is, the set of conditions for one set of rules could overlap with another set of rules. For example, one set of rules could completely over shadow a second set of rules. In such a case, the second set of rules would never match and could be identified as redundant and marked for manual or automatic removal. In other cases, such shadowing could be indicative of a conflict, in which case, an administrator may be notified or in the alternative, the application of any change causing such a conflict should be rejected. In other cases, the overlap could be partial and in some of these cases, it might be beneficial to unify the two sets of rules to a single set, ideally with a smaller number of rules compared to the combined number of rules in both sets.

An inefficiency may alternatively or additionally include identifying unused elements (e.g., rules that used to apply, but changes in network structure result in the rule no longer being match) as candidates for removal or to be automatically removed. For example, an object identifying a network that was previously used in a now deleted rule and which has now no use in the policy could be flagged for deletion or automatically deleted.

The security gap may be a suggestion to replace a permissive rule with a restrictive rule (i.e., a rule more restrictive than the permissive rule). The security gap may alternatively or additionally include suggesting and/or implementing transitioning from deprecated security policy features to newer features.

The optimization opportunity may be a suggested reordering of the rules to improve processing efficiency and reduce latency. For example, the suggested reordering of the rules may identify rules that should be matched before or after other rules. This reordering may be due to different factors. For example, it is often desirable when there are rules which are more likely to match than others. Additionally, the matching of certain rules may be more resource intensive than others. In such a case it may be desirable to put the more expensive rules after other, less resource intensive rules.

The policy beautification may be a suggested restructuring of the original security policy using at least one of new layers, new sections, rearrangement of the rules in the layers and sections of the original security policy, or new names for at least one of the layers or the sections of the original security policy.

In one embodiment, the processor circuitry 30 sends a prompt 84 to the AI engine 12 including security objectives. The prompt 84 may be a natural language description of the task to be performed. For example, the prompt 84 may request for the LLM 20 to identify rules contributing to preventing unauthorized user access to a database. In this way, the prompt 84 may allow a user to ask dynamic questions about the policy (e.g., not necessarily regarding optimization of the security policy). In response to the prompt 84, the computer circuitry 18 may generate a policy insight 76 including at least one essence understanding. For each of the security objectives included in the prompt 84, the essence understanding may identify any contributing rules 38 that contribute to achievement of the security objective.

Below is an exemplary list of possible prompts:

Policy Orientation
1. List all the rules in the current firewall policy.
2. Check if Drew Diamond has access to Git in the current firewall policy.
3. Identify any rules in the current firewall policy that allow traffic from China.

Rules Consistency
1. Analyze the current firewall policy and identify any rule conflicts.
2. Find rules in the current firewall policy that are similar to each other.

Security Compliance
1. Identify any overly permissive rules in the current firewall policy.

Policy Optimization
1. List all unused objects in the current firewall policy that do not have any references in the rules.
1. Suggest appropriate comments and tags for the rules in the current firewall policy to improve clarity.
2. Identify rules in the current firewall policy that can be unified into a single rule.
3. Suggest optimizations for the current firewall policy layers, including creating new layers, splitting existing layers, and reordering rules within layers.

Rule Positioning
2. Determine the current policy verdict for granting access to <User A> for <Resource R1> in the firewall policy.
3. Determine the current policy verdict for granting Elizabeth_Harris access to Git in the firewall policy.
4. Suggest the best method to grant Elizabeth_Harris access to Git in the firewall policy.
5. Suggest the best policy changes needed to grant Elizabeth_Harris access to Git.

The processor circuitry 30 of the processing engine 14 receives the identified policy insights 76 and outputs a security review 80 based on the received policy insights 76. For example, the processor circuitry 30 may generate and display an insight report dashboard including recommendations and actionable items based on the received policy insights 76. For example, the insight report dashboard may visually display the contents of the policy insights 76.

As another example, the processor circuitry 30 may generate a modified security policy by implementing at least one of the received policy insights to modify the original security policy. The processor circuitry 30 may then validate the generated modified security policy by comparing a performance of the modified security policy to a performance of the original security policy. For example, the processor circuitry 30 may modify the original security policy by modifying the code representation 52 based on the received policy insights. The processor circuitry 30 may then compare the modified code representation against the original code representation using various predefined criteria. When the performance of the modified security policy is better than the performance of the original security policy, the processor circuitry 30 may include the modified security policy in the security review 80. In one embodiment, the processor circuitry 30 may modify the original security policy based on the modified security policy using an API and/or a network protocol.

The computer circuitry 18 and processor circuitry 30 may have various implementations. For example, the computer circuitry 18 and processor circuitry 30 may include any suitable device, such as a processor (e.g., CPU, Graphics Processing Unit (GPU), Tensor Processing Unit (TPU), etc.), programmable circuit, integrated circuit, memory and I/O circuits, an application specific integrated circuit, microcontroller, complex programmable logic device, other programmable circuits, or the like. The computer circuitry 18 and processor circuitry 30 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the computer circuitry 18 and processor circuitry 30. The computer circuitry 18 and processor circuitry 30 may be communicatively coupled to the computer readable medium and a network interface through a system bus, mother board, or using any other suitable structure known in the art.

The computer readable medium (memory) 16, 32 may be, for example, one or more of a buffer, a flash memory, a hard drive, a removable media, a volatile memory, a non-volatile memory, a random-access memory (RAM), or other suitable device. In a typical arrangement, the memory 16, 32 may include a non-volatile memory for long term data storage and a volatile memory that functions as system memory for the computer circuitry 18 and processor circuitry 30. The memory 16, 32 may exchange data with the processor circuitry over a data bus. Accompanying control lines and an address bus between the memory 16, 98 and the processor circuitry also may be present. The memory 16, 32 is considered a non-transitory computer readable medium.

AI engine 12 and processing engine 14 may communicate with one another via any networked device capable of communication within a network infrastructure. Examples of such network devices include but are not limited to printers, Internet of Things (IoT) devices, routers, switches, access points, servers, printers, automobiles, security systems, thermostats and any other devices equipped with network interfaces. The network device may be connected through wired or wireless connections. It should be noted that the method is designed to be compatible with various network protocols and standards, such as Ethernet, Wi-Fi, Bluetooth, Zigbee, or cellular networks, allowing for flexible deployment in diverse networking environments.

The AI engine 12 and processing engine 14 may each be embodied as any suitable computer device. These computer devices may encompass a wide range of computing devices suitable for performing the disclosed functions and methods. This includes but is not limited to servers, desktop computers, network switches, routers, laptops, mobile devices, tablets, and any other computerized device capable of executing software instructions. The computer devices may include standard components such as a processor, memory, storage, input/output interfaces, and other necessary elements to execute the methods effectively. Furthermore, the computer device is not limited to a single device but may be embodied in a distributed computing environment. In such an environment, multiple interconnected devices may collaborate and work in unison to execute the computational steps of the methods and functions.

Figure 3:
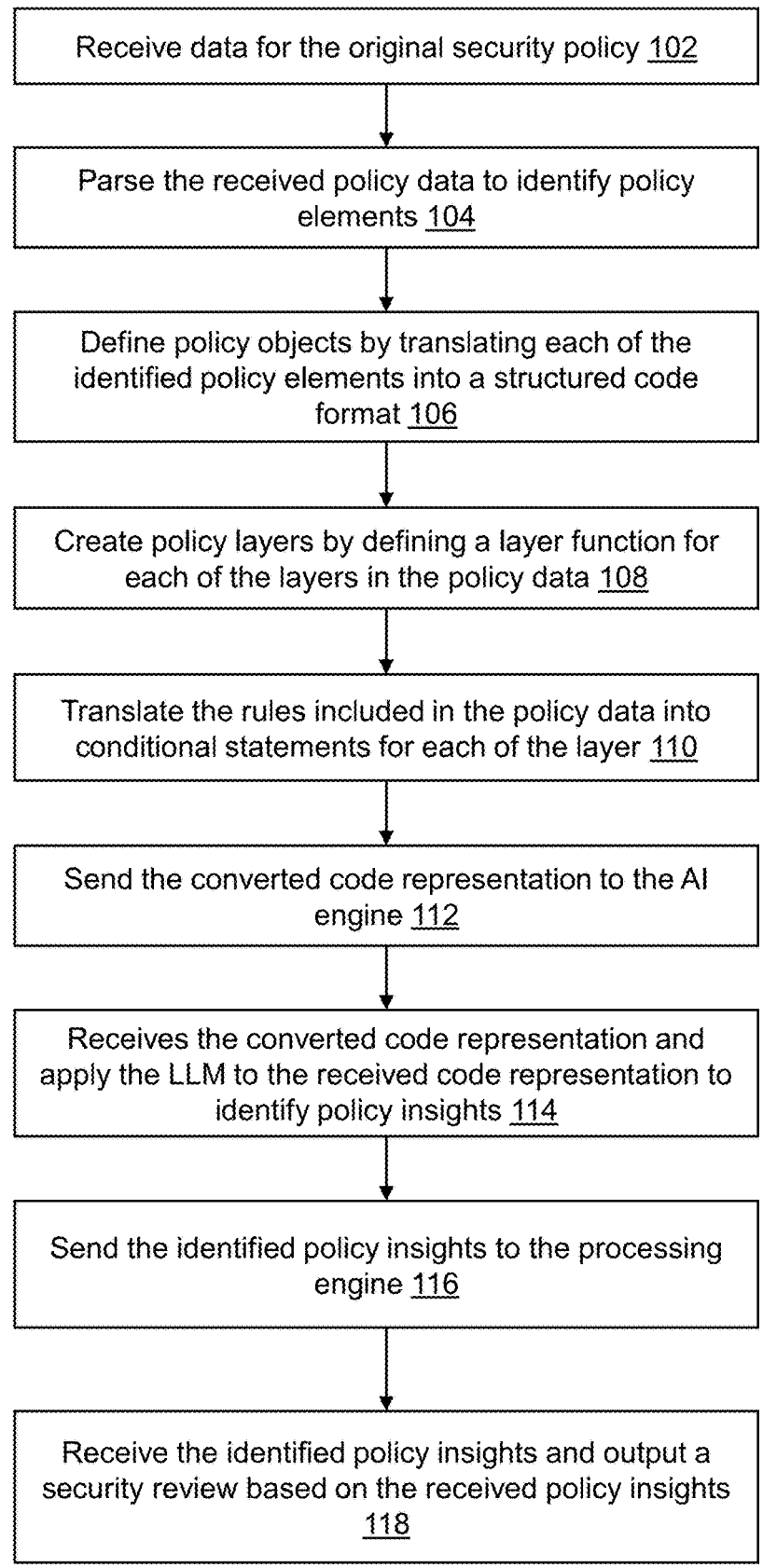
FIG. 3 is an exemplary flow diagram of a method for refactoring an original security policy using an artificial intelligence (AI) engine including a large language model (LLM) and a processing engine including processor circuitry.

Turning to FIG. 3, a method 100 is shown for refactoring an original security policy using an artificial intelligence (AI) engine including processor circuitry and a large language model (LLM). The method 100 involves processor circuitry executing the below described steps.

In step 102, the processor circuitry receives policy data for the original security policy. As described above, the policy data comprises a configuration of the original security policy and includes rules and at least one of network objects, services, groups, zones, or layers. For example, the policy data may include at least rules, network objects, and layers.

In step 104, the processor circuitry parses the received policy data to identify policy elements. The policy elements comprise the network objects, services, groups, and zones included in the policy data.

In steps 106, 108, and 110, the processor circuitry converts the original security policy into a code representation. In step 106, policy objects are defined by translating each of the identified policy elements into a structured code format. In step 108, policy layers are created by defining a layer function for each of the layers in the policy data. As described above, each of the layer functions encapsulates the one or more rules associated with the layer defined by the layer function. In step 110, the rules included in the policy data are translated into conditional statements for each of the layer functions. This translation is performed by converting each of the one or more rules associated with the layer into a conditional statement.

In step 112, sending with the processor circuitry the converted code representation to the AI engine. In step 114, the computer circuitry receives and analyzes the converted code representation by applying the stored LLM to the received code representation to identify policy insights.

In step 116, the computer circuitry sends the identified policy insights to the processing engine. In step 118, the processor circuitry receives the identified policy insights and outputs a security review based on the received policy insights.

The method 100 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 100 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for refactoring an original security policy using an artificial intelligence (AI) engine including a large language model (LLM), the computer device comprising:
    processor circuitry configured to:
        receive policy data for the original security policy, wherein:
            the policy data comprises a configuration of the original security policy and includes rules and at least one of network objects, services, groups, zones, or layers; and
            each of the rules is associated with one of the layers, such that each of the layers is associated with one or more rules;
        parsing the received policy data to identify policy elements, wherein the policy elements comprise the network objects, services, groups, and zones included in the policy data;
        converting the original security policy into a code representation by:
            defining policy objects by translating each of the identified policy elements into a structured code format;
            creating policy layers by defining a layer function for each of the layers in the policy data, wherein each of the layer functions encapsulates the one or more rules associated with the layer defined by the layer function; and
            translating the rules included in the policy data into conditional statements for each of the layer functions by converting into a conditional statement each of the one or more rules associated with the layer defined by the layer function, wherein:
                each of the conditional statements includes a condition and a corresponding action;
                the condition comprises at least one of a check for source, destination, or service; and
                the corresponding action is performed when the condition is met;
        sending the converted code representation to the AI engine to analyze the original security policy, such that the AI engine applies the LLM to the code representation and identifies policy insights;
        receiving from the AI engine the identified policy insights; and
        outputting a security review based on the received policy insights.

2. The computer device of claim 1, wherein the identified policy insights include at least one inefficiency comprising at least one of redundant rules, similar conditions combinable into a combined condition, or a restructuring rules for better performance.

3. The computer device of claim 1, wherein the identified policy insights include at least one security gap comprising replacing a permissive rule with a restrictive rule.

4. The computer device of claim 1, wherein the identified policy insights include at least one optimization opportunity comprising reordering the rules to improve processing efficiency and reduce latency.

5. The computer device of claim 1, wherein:
the processor circuitry is further configured to send a prompt to the AI engine including security objectives; and
the received identified policy insight includes at least one essence understanding comprising, for each of the sent security objectives, identifying any contributing rules from the rules of the original security policy that contribute to achievement of the security objective.

6. The computer device of claim 1, wherein the identified policy insight includes at least one policy beautification comprising restructuring the original security policy using at least one of new layers, new sections, rearrangement of the rules in the layers and sections of the original security policy, or new names for at least one of the layers or the sections of the original security policy.

7. The computer device of claim 1, wherein the outputting of the security review includes generating and displaying an insight report dashboard including recommendations and actionable items based on the received policy insights.

8. The computer device of claim 1, wherein the parsing of the policy data includes determining element dependencies between the identified policy elements including:
referred objects identifying objects referenced by each of the rules; and
a hierarchical structure of the layers.

9. The computer device of claim 1, wherein:
the processor circuitry is further configured to:
generate a modified security policy by implementing at least one of the received policy insights to modify the original security policy; and
validate the generated modified security policy by comparing a performance of the modified security policy to a performance of the original security policy; and
when the performance of the modified security policy is better than the performance of the original security policy, the outputting of the security review based on the received policy insights includes outputting the modified security policy.

10. The computer device of claim 1, wherein the structured code format representing each of the translated policy elements comprises one or more of a dictionary or class.

11. The computer device of claim 1, wherein the processor circuitry is further configured to:
before receiving the policy data, send a request for the policy data from a security management system using an application programming interface (API).

12. A system for refactoring an original security policy, the system comprising:
an AI engine comprising a computer device including a memory comprising a non-transitory computer readable medium storing a large language model (LLM);
a processing engine comprising an electronic device including processor circuitry configured to:
receive policy data for the original security policy, wherein:
the policy data comprises a configuration of the original security policy and includes rules and at least one of network objects, services, groups, zones, or layers; and
each of the rules is associated with one of the layers, such that each of the layers is associated with one or more rules;
parsing the received policy data to identify policy elements, wherein the policy elements comprise the network objects, services, groups, and zones included in the policy data;
converting the original security policy into a code representation by:
defining policy objects by translating each of the identified policy elements into a structured code format;
creating policy layers by defining a layer function for each of the layers in the policy data, wherein each of the layer functions encapsulates the one or more rules associated with the layer defined by the layer function; and
translating the rules included in the policy data into conditional statements for each of the layer functions by converting into a conditional statement each of the one or more rules associated with the layer defined by the layer function, wherein:
each of the conditional statements includes a condition and a corresponding action;
the condition comprises at least one of a check for source, destination, or service; and
the corresponding action is performed when the condition is met;
sending the converted code representation to the AI engine;
wherein the AI engine further includes computer circuitry configured to:
receive the converted code representation;
analyze the original security policy by applying the stored LLM to the received code representation to identify policy insights;
send the identified policy insights to the processing engine;
wherein the processor circuitry of the processing engine is further configured to:
receive the identified policy insights; and
output a security review based on the received policy insights.

13. The system of claim 12, wherein:
the processor circuitry is further configured to send a prompt to the AI engine including security objectives; and
the received identified policy insight includes at least one essence understanding comprising, for each of the sent security objectives, identifying any contributing rules from the rules of the original security policy that contribute to achievement of the security objective.

14. The system of claim 12, wherein the identified policy insight includes at least one policy beautification comprising restructuring the original security policy using at least one of new layers, new sections, rearrangement of the rules in the layers and sections of the original security policy, or new names for at least one of the layers or the sections of the original security policy.

15. The system of claim 12, wherein the outputting of the security review includes generating and displaying an insight report dashboard including recommendations and actionable items based on the received policy insights.

16. The system of claim 12, wherein the parsing of the policy data includes determining element dependencies between the identified policy elements including:
- referred objects identifying objects referenced by each of the rules; and
- a hierarchical structure of the layers.

17. The system of claim 12, wherein:
the processor circuitry is further configured to:
- generate a modified security policy by implementing at least one of the received policy insights to modify the original security policy; and
- validate the generated modified security policy by comparing a performance of the modified security policy to a performance of the original security policy; and when the performance of the modified security policy is better than the performance of the original security policy, the outputting of the security review based on the received policy insights includes outputting the modified security policy.

18. The system of claim 12, wherein the structured code format representing each of the translated policy elements comprises one or more of a dictionary or class.

19. The system of claim 12, wherein the processor circuitry is further configured to:
before receiving the policy data, send a request for the policy data from a security management system using an application programming interface (API).

20. A method for refactoring an original security policy using an artificial intelligence (AI) engine including processor circuitry and a large language model (LLM), and a processing engine including processor circuitry, the method comprising:
receive with the processor circuitry policy data for the original security policy, wherein:
- the policy data comprises a configuration of the original security policy and includes rules and at least one of network objects, services, groups, zones, or layers; and
- each of the rules is associated with one of the layers, such that each of the layers is associated with one or more rules;

parsing with the processor circuitry the received policy data to identify policy elements, wherein the policy elements comprise the network objects, services, groups, and zones included in the policy data;

converting with the processor circuitry the original security policy into a code representation by:
- defining policy objects by translating each of the identified policy elements into a structured code format;
- creating policy layers by defining a layer function for each of the layers in the policy data, wherein each of the layer functions encapsulates the one or more rules associated with the layer defined by the layer function; and
- translating the rules included in the policy data into conditional statements for each of the layer functions by converting into a conditional statement each of the one or more rules associated with the layer defined by the layer function, wherein:
  - each of the conditional statements includes a condition and a corresponding action;
  - the condition comprises at least one of a check for source, destination, or service; and
  - the corresponding action is performed when the condition is met;

sending with the processor circuitry the converted code representation to the AI engine;
receive with the computer circuitry the converted code representation;
analyze with the computer circuitry the original security policy by applying the stored LLM to the received code representation to identify policy insights;
send with the computer circuitry the identified policy insights to the processing engine;
receive with the processor circuitry the identified policy insights;
output with the processor circuitry a security review based on the received policy insights.

* * * * *